United States Patent [19]

Johnston et al.

[11] Patent Number: 4,536,697

[45] Date of Patent: Aug. 20, 1985

[54] VEHICLE ELECTRICAL ENERGY MANAGEMENT SYSTEM

[75] Inventors: Ralph H. Johnston, Anderson; Curtis D. Munden, Carmel; Leonard J. Sheldrake, Noblesville, all of Ind.

[73] Assignee: General Motors Corporation, Detroit, Mich.

[21] Appl. No.: 530,723

[22] Filed: Sep. 9, 1983

[51] Int. Cl.³ ................... F02B 67/04; H02J 7/14
[52] U.S. Cl. ................... 322/14; 180/282; 188/159; 320/61; 322/59
[58] Field of Search .......... 320/61, 43, 64, 44, 320/35; 322/14, 28, 7, 8, 33, 35, 59, 69, 80; 318/376, 382; 188/156, 159, 160; 290/14–17; 180/282; 192/0.07

[56] References Cited

U.S. PATENT DOCUMENTS

| | | | |
|---|---|---|---|
| 2,421,523 | 6/1947 | Rady | 320/35 |
| 3,539,864 | 11/1970 | Harland, Jr. et al. | 322/28 X |
| 3,918,543 | 11/1975 | Halem | 180/282 |
| 4,246,529 | 1/1981 | Jurgens et al. | 320/39 |
| 4,310,793 | 1/1982 | Sheldrake et al. | 322/28 |

*Primary Examiner*—R. J. Hickey
*Attorney, Agent, or Firm*—Mark A. Navarre

[57] ABSTRACT

In a charge/float vehicle electrical system, heavy battery charging is effected during periods of engine deceleration and the float voltage is adjusted so as to maintain the battery state of charge at the level in existence at the initiation of the float mode.

4 Claims, 1 Drawing Figure

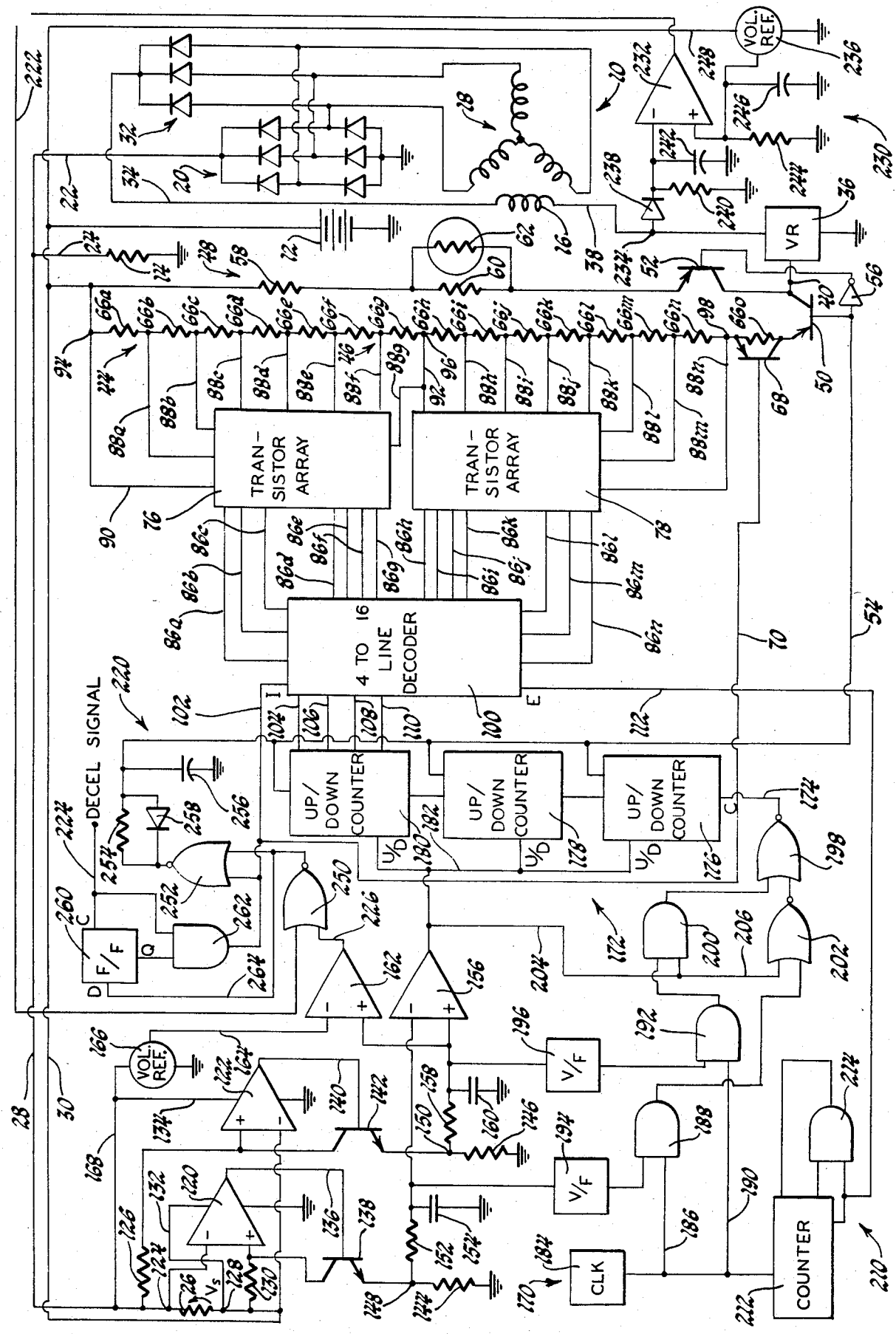

VEHICLE ELECTRICAL ENERGY MANAGEMENT SYSTEM

This invention is an improvement for a motor vehicle battery charging system of the type having one mode of operation wherein the battery is charged at a normal rate determined according to the operating parameters of the battery and another mode of operation wherein the battery is charged at a substantially reduced rate to reduce energy expenditure in the vehicle.

Battery charging systems of the above type are generally referred to as charge/float systems. In one mode—the charge mode—the generator output voltage used to charge the battery is controlled as a function of the battery voltage and temperature so that the battery is charged at the optimum rate. In the other mode—the float mode—the generator output voltage is reduced to a float value substantially equal to the nominal open circuit terminal voltage of the battery, a voltage sufficient only to prevent self-discharge of the battery.

Initially, the charge mode is engaged. The float mode is engaged when the battery reaches a predetermined state of charge, as may be determined by monitoring the charging current. One such system is described in detail in the U.S. Pat. No. 4,310,793 to Sheldrake et al., which patent is assigned to the assignee of this invention. This system has proven to be an effective expedient in reducing the battery charging energy requirements of a vehicle while maintaining the battery state of charge at an adequate level.

The object of this invention is to further enhance the energy efficiency of the above-described system by utilizing the vehicle inertia for battery charging during engine deceleration and by adjusting the generator output voltage during the float mode such that the battery state of charge in effect at the engagement of the float mode is maintained.

This object is carried forward with a conventional voltage regulating mechanism, a battery current integrator and circuitry responsive to the battery current integrator for controlling the operation of the voltage regulator in a manner to suitably adjust the generator output voltage.

Each time the vehicle is started, the charge mode of operation is initiated and the generator output voltage is determined according to the battery voltage and temperature. When the battery charging current under such conditions falls to a reference value indicating that the battery state of charge has reached a predetermined and satisfactory value, such as 80% of full charge, the charge mode of operation is interrupted and the float mode of operation initiated. At such point, the generator output voltage is reduced substantially to the nominal open circuit terminal voltage of the battery and the current integrator is reset to initiate measurement of the net current into and out of the battery. Each time the engine deceleration exceeds a reference amount following the initiation of the float mode of operation, the generator output voltage is increased to a fixed and relatively high value to produce relatively heavy battery charging to thereby recoup kinetic energy associated with the moving mass of the vehicle. An increased demand from the vehicle electrical loads may result in a net current flow out of the battery while heavy charging during periods of engine deceleration may result in a current flow into the battery. In either case, the current integrator measures the net battery current and serves to adjust the generator output voltage either up or down from the float voltage in a manner to drive the measured net battery current to zero.

If the current integrator senses a net current into the battery, indicating recent charging on deceleration, the generator output voltage is decreased from the float value, allowing the battery to supply more of the current to the electrical loads. If the current integrator measures a net current out of the battery, indicating an increased electrical load demand, the generator output voltage is increased so that charging current is returned to the battery. In this way, the current integrator serves to maintain the predetermined battery state of charge in effect at the initiation of the float mode, taking into account the variable electrical load demand and the variable charging occasioned by engine deceleration.

The single drawing is a circuit diagram of a vehicle electrical system configured according to the teachings of this invention.

In the drawing, reference numeral 10 generally designates an automotive generator for supplying charging current to battery 12 and for supplying power to the motor vehicle electrical loads 14. Generator 10 is illustrated as an alternator having an engine driven field winding 16 and a WYE connected stator winding 18. When field winding 16 is excited with direct current, stator winding 18 develops an alternating current voltage which is converted to a direct current voltage by bridge rectifier 20. Bridge rectifier 20 is connected via lines 22 and 24 to supply current to electrical loads 14. In addition, bridge rectifier 20 is connected through current shunt 26 via lines 22, 28 and 30 to supply charging current to battery 12. As will be understood by those skilled in the art, the voltage $V_s$ across current shunt 26 thereby bears a known relationship to the battery charge and discharge current. The polarity of the shunt voltage $V_s$ indicates whether charging current is being supplied to battery 12 (positive) or whether battery 12 is supplying current to electrical loads 14 (negative), while the magnitude of the shunt voltage $V_s$ indicates the magnitude of the current.

Diode trio 32 provides a separate source of direct current for energizing field winding 16 and is connected to one terminal of field winding 16 via line 34. The other terminal of field winding 16 is connected to voltage regulator 36 via line 38. Voltage regulator 36 is a conventional switching regulator and operates in response to the voltage potential at terminal 40 to control the current through field winding 16 by intermittently connecting line 38 to ground potential. As the voltage at terminal 40 decreases, the excitation of field winding 16 is increased to increase the output voltage of stator winding 18.

Similarly, as the voltage at terminal 40 increases, the excitation of field winding 16 is decreased to decrease the output voltage of stator winding 18. The voltage regulator 36 may also include means for initially exciting field winding 16 when the motor vehicle is started. A voltage regulator meeting the above specification is more completely described in the U.S. Pat. No. 3,539,864 to Harland, Jr. et al. More specifically, the terminal 40 as disclosed herein, corresponds to the terminal 107 as shown in FIG. 1 of the Harland, Jr. et al. patent.

The voltage at terminal 40, and hence the output voltage of generator 10, is determined as a function of the voltage drop across the resistance network designated generally by the reference numeral 44. Network 44 comprises two parallel circuit paths 46 and 48 connected between the positive terminal of battery 12 and terminal 40 of voltage regulator 36 via the emitter collector circuit paths of PNP transistors 50 and 52. The conduction of transistors 50 and 52 is controlled in accordance with the voltage potential on line 54 and an inverter 56 is connected between the base electrodes of transistors 50 and 52 to maintain the transistors in opposite states of conductivity. When line 54 is at a logic 1 voltage potential, transistor 50 is biased nonconductive to effectively disconnect circuit path 46 from terminal 40, and transistor 52 is biased to its conductive state to connect circuit path 48 to terminal 40. When line 54 is at a logic 0 voltage potential, transistor 50 is biased to its conductive state to connect circuit path 46 to terminal 40 and transistor 52 is biased to its nonconductive state to effectively disconnect circuit path 48 from terminal 40.

As will later be explained, the normal or charge mode of operation is in effect when line 54 is at a logic 1 voltage potential, thereby serving to connect circuit path 48 of network 44 between the positive terminal of battery 12 and the terminal 40 of voltage regulator 36. Circuit path 48 comprises two serially connected resistors 58 and 60, and a thermistor 62 connected parallel with resistor 60. Thermistor 62 has a negative temperature coefficient of resistance and located so as to sense the temperature of the electrolyte in battery 12. Preferably, thermistor 62 is placed in a cavity of battery 12 so as to be submerged in the battery electrolyte. Such an arrangement is described in detail in the U.S. Pat. No. 2,421,523 to Rady, which patent is assigned to the assignee of the present invention.

It will be understood by those skilled in the art that the resistance of thermistor 62 will therefore vary as a function of the temperature of the electrolyte in battery 12. Specifically, its resistance decreases with increasing battery temperature and increases with decreasing battery temperature. In this way, the circuit path 48 of network 44 tends to increase the voltage applied to terminal 40 of voltage regulator 36 as the temperature of the electrolyte in battery 12 increases, and to decrease the voltage applied to terminal 40 as the temperature of the electrolyte in the battery 12 decreases. The resistors 58 and 60 are chosen so that the resultant energization of field winding 16 by voltage regulator 36 causes generator 10 to produce a nominal charging voltage of about 14.5 volts. As indicated above, thermistor 62 causes the actual charging voltage developed by generator 10 to vary as a function of the temperature of the electrolyte in battery 12.

When line 54 is at a 0 logic potential, transistor 50 is biased to its conductive state to effectively connect circuit branch 46 of network 44 between the positive terminal of battery 12 and terminal 40 of voltage regulator 36 to thereby establish the "float" mode of operation. As indicated earlier, the object of the "float" mode of operation is to reduce the output voltage of generator 10 to a float value determined in relation to the nominal open circuit terminal voltage of battery 12 when battery 12 is sufficiently charged to thereby avoid the energy consumption associated with continued charging of battery 12 from the generator 10. Since the generator 10 is driven by the vehicle engine, the reduced energy consumption results in improved fuel economy. In the illustrated embodiment, the circuit branch 46 is comprised of 15 serially connected resistors 66a-66o. The actual value of the float voltage developed by generator 10 is determined according to the total serial resistance in circuit path 46, and as will later be explained, the total series resistance of the circuit path 46 is adjusted according to this invention in a manner to maintain battery 12 at the state of charge in effect at the initiation of the float mode of operation.

As indicated above, this invention also envisions a decel mode of operation effective during engine deceleration in excess of a reference amount for increasing the output voltage of generator 10 to a relatively high value to produce relatively heavy battery charging and thereby recoup kinetic energy from the vehicle during such deceleration. To this end, the emitter collector circuit of transistor 68 is connected across one of the serially connected resistors 66o in circuit path 46 of network 44. When line 70 is at a logic 0 voltage potential, transistor 68 is biased to its conductive state to provide a low resistance path around resistor 66o, thereby reducing the total resistance in the circuit path 46 and causing the output of generator 10 to be increased. When line 70 is at a logic 1 voltage potential, transistor 68 is biased to its nonconductive state so that the resistance of resistor 66o is included in the total serial resistance of circuit path 46.

The total serial resistance of the circuit path 46—and hence the voltage applied to terminal 40 of voltage regulator 36 during the float mode of operation—is determined by the conduction states of transistor arrays 76 and 78. Each of the transistor arrays includes seven NPN transistors connected in common collector configuration. The lines 86a-86n are connected to the transistor base terminals and the lines 88a-88n are connected to the transistor emitter terminals. The line 90 is connected to the collector node of transistor array 76 and the line 92 is connected to the collector node of transistor array 78. The line 90 is connected to terminal 94 of circuit branch 46 and the line 92 is connected to the terminal 96 of circuit branch 46. Each of the lines 88a-88n is connected to a different point in the serial circuit comprising resistors 66a-66n so that the emitter-collector circuit of each of the array transistors is connected in shunt with one or more of the resistors 66a-66n. It will be understood by those skilled in the art that the logic voltage potential on lines 86a-86n determines the conduction state of the respective array transistors and thus the total serial resistance between terminals 94 and 98 of circuit branch 46.

Transistor arrays meeting the above specifications are commercially available in the form of an integrated circuit such as the CA3082 device manufactured by RCA Corporation, Somerville, N.J.

The logic voltage potential on lines 86a-86n is controlled by four to sixteen line decoder circuit 100, the operation of which is governed in turn by the logic voltage potential on lines 102-112. The four to sixteen line decoder 100 functions to expand a four bit digital address on lines 104-110 to a maximum of sixteen discrete outputs. In the illustrated embodiment, however, only fourteen (86a-86n) of the available sixteen discrete outputs are used. The four to sixteen line decoder 100 is commercially available in the form of an integrated circuit such as the CD4515 device manufactured by RCA Corporation. As will be explained below, the four bit logical address on lines 104-110 is determined as a function of the charge/discharge history of battery 12 in a manner to vary the total serial resistance in circuit path 46 to thereby adjust the float voltage produced by generator 10 to a suitable value.

The voltage $V_s$ across current shunt 26 is applied as an input to both operational amplifiers 120 and 122. The terminal 124 of current shunt 26 is applied directly to the minus input of operational amplifier 120 and through resistor 126 to the plus input of operational amplifier 122. The terminal 129 of current shunt 26 is applied directly to the minus input of operational amplifier 122 and through resistor 130 to the plus input of operational amplifier 120. The source voltage for operational amplifiers 120 and 122 is obtained from battery 12 or generator 10 via lines 132 and 134.

The output of operational amplifier 120 is connected via line 136 to the base terminal of NPN transistor 138 and the output of operational amplifier 122 is connected via line 140 to the base input of transistor 142. The emitter of transistor 138 is connected to ground potential through resistor 144 and the emitter of transistor 142 is connected to ground potential through resistor 146.

When battery 12 is being charged by generator 10, the shunt voltage $V_s$ is positive so that operational amplifier 120 biases transistor 138 to a nonconductive state and operational amplifier 122 biases the transistor 142 to a conductive state. Conversely, when the battery 12 is supplying power to the electrical loads 14, the shunt voltage $V_s$ is negative. In such case, operational amplifier 120 biases transistor 138 to its conductive state and operational amplifier 122 biases transistor 142 to its nonconductive state. It will thus be understood that the voltage at terminal 148 provides an indication of the instantaneous current being supplied by battery 12 to the electrical loads 14 and that the voltage at terminal 150 provides an indication of the instantaneous current supplied from generator 10 to battery 12. Terminal 148 is connected through an RC circuit comprising resistor 152 and capacitor 154 to the minus input of comparator 156 and terminal 150 is connected through an RC circuit comprising resistor 158 and capacitor 160 to the plus input of comparator 156 and to the plus input of comparator 162. The minus input of comparator 162 is connected via line 164 to the output of a voltage reference circuit 166 such as the AD580 manufactured by National Semiconductor Corporation, Santa Clara, Calif. The supply voltage for voltage reference source 166 is obtained from battery 12 or generator 10 via line 168.

In view of the above, it will be understood that the output of comparator 162 provides an indication of the magnitude of the charging current relative to the reference voltage on line 164 which, according to the preferred embodiment of this invention, corresponds to a current of approximately 10 amperes. When the charging current is greater than 10 amperes, the output of comparator 162 is at a logic 1 voltage potential; when the charging current is less than 10 amperes, the output of comparator 162 is at a logic 0 voltage potential. In view of the above, it will also be recognized that the output of comparator 156 provides an indication of the battery current direction. If the battery is being charged, the output of comparator 156 is at a logic 1 voltage level; if the battery 12 is being discharged, the output of comparator 156 is at a logic 0 voltage potential.

As will later be described, the output of comparator 162 is used to determine if the float mode of operation is appropriate, and the output of comparator 156 is used as an input for a battery current integrator.

The battery current integrator comprises a clocking circuit designated generally by the reference numeral 170 and a counter circuit designated generally by the reference numeral 172. The clocking circuit 170 operates in response to the instantaneous magnitudes of the battery charge and discharge currents to produce a variable frequency clock signal on line 174 for counter 172. Counter 172 comprises three four-stage binary up/down counters 176, 178 and 180 for receiving clock signals on line 174 and for providing a four bit input to four-to-sixteen line decoder 100 via lines 104–110 in accordance with the time integral of the battery current. The output level of comparator 156 determines the direction of integration and accordingly, is connected to the U/D input of each counter 176–180 via line 182.

Referring now to the clocking circuit 170 in more detail, a clock oscillator 184 is connected via line 186 to one input of AND gate 188 and via line 190 to one input of AND gate 192. A voltage-to-frequency converter 194, is connected between the other input of AND gate 188 and the junction between resistor 152 and capacitor 154 of the battery discharge current RC circuit and the voltage-to-frequency converter 196 is connected between the other input of AND gate 192 and the junction between resistor 158 and capacitor 160 of the battery charging current RC circuit. The voltage-to-frequency converters 194 and 196 are commercially available in the form of integrated circuits such as the LM131 device manufactured by National Semiconductor Corporation, and operate to provide an output signal, the frequency of which varies in direct relation to the input voltage magnitude. Thus, the signal frequency at the output of AND gate 188 varies in direct relation to the magnitude of the discharge current supplied by battery 12 to electrical loads 14 and the signal frequency at the output of AND gate 192 varies in direct relation to the magnitude of the battery charging current supplied by generator 10 to battery 12.

The output of AND gate 192 is connected to one input of NOR gate 198 through AND gate 200 and the output of AND gate 188 is connected to the other input of NOR gate 198 through NOR gate 202. AND gate 200 is also connected via line 204 to the output of comparator 156 and operates to pass the output of AND gate 192 when the battery 12 is being charged and to block the output of AND gate 192 when the battery 12 is being discharged. NOR gate 202 is also connected via lines 204 and 206 to the output of comparator 156 and operates to pass the output of AND gate 188 when the battery 12 is being discharged and to block the output of AND gate 192 when the battery 12 is being charged. Thus, the clock signal on line 174 is developed in accordance with the output of AND gate 188 when battery 12 is being discharged and in accordance with the output of AND gate 192 when the battery is being charged.

As noted above, the clock signal on line 174 is connected to the clock input of up/down counter 176 so that the counting rate of counter circuit 172 is determined in accordance with the voltage at terminal 148 when battery 12 is being discharged and in accordance with the voltage at terminal 150, when the battery is being charged. The output of comparator 156 is connected to the U/D input of counters 176–180 so that the clock pulses on line 174 are accumulated in the up or positive direction when the battery 12 is being charged and in the down or negative direction when the battery 12 is being discharged. In this way, the output lines 104–110 of counter 180 represent the four most significant bits of a twelve bit number representative of the time integral of the battery current.

As indicated earlier, the four bit output of counter 180 on lines 104–110 is used to address four to sixteen line decoder 100 to control the total serial resistance in circuit branch 46 of resistor network 44. As a result, the output voltage of generator 10 during the float mode of operation is regulated in accordance with the past history or time integral of the battery current. As will later be explained, the counter output is reset at the establishment of the float mode of operation and thereafter the output of counter 180 on lines 104–110 provide an indication of the net battery current. If following the establishment of the float mode of operation, the output of counter 180 indicates a net current out of the battery, four to sixteen line decoder 100 changes the conduction state of the various array transistors to increase the total serial resistance in circuit path 46 to thereby increase the output voltage of generator 10. If, on the other hand, the output of counter 180 indicates a net current into the battery, four-to-sixteen line decoder 100 changes the conduction state of the array transistors to decrease the total serial resistance of circuit branch 46 to decrease the output voltage of generator 10. In this way, the output voltage of generator 10 is adjusted during the float mode of operation in a manner to maintain the battery state of charge in effect at the establishment of the float mode of operation. Not only is the battery maintained at a sufficient state of charge, but excessive charging of a sufficiently charged battery and the energy wastage associated therewith, is avoided.

According to another aspect of this invention, the four to sixteen line decoder 100 is periodically rather than continuously enabled to change the conduction state of the array transistors to change the output voltage of generator 10. To this end, the output of clock oscillator 184 is applied as an input to a divider circuit 210 comprising counter 212 and AND gate 214. Divider circuit 210 serves to divide the output frequency of clock oscillator 184 down to a relatively low frequency signal for strobing or periodically enabling four-to-sixteen line decoder 100 to change the conduction state of the array transistors. Such strobe signal is applied via line 112 to the strobe or enable input (E) of four-to-sixteen line decoder 100. According to the preferred embodiment, four-to-sixteen line decoder 100 is strobed at a relatively low rate such as two times per minute.

Logic circuitry for establishing the charge, float and decel modes of operation is designated generally by reference numeral 220. The signals affecting the operation of logic circuit 220 include a full field signal on line 222, a decel signal on line 224 and the output of comparator 162 on line 226. The logic voltage potential of the full field signal on line 222 indicates whether the generator field coil 16 is fully excited. The full field signal is developed by circuit designated generally by the reference numeral 230 which essentially comprises a comparator 232 for comparing the voltage at voltage regulator terminal 234 with a reference voltage developed by voltage reference source 236. The voltage at terminal 234 is applied to minus input of comparator 232 through a serially connected diode 238 and a parallel RC circuit comprising resistor 240 and capacitor 242. The output of voltage reference source 236 is applied to the plus input of comparator 232 through a parallel RC circuit comprising resistor 244 and capacitor 246. Diode 238 provides isolation between the voltage regulator 236 and the full field circuit 230. When the field coil 16 is fully excited, terminal 234 is essentially at ground potential and the reference voltage drives the output of comparator 232 to a logic 1 voltage potential. When the field winding 16 is less than fully excited, the voltage at terminal 234 exceeds the reference voltage provided by voltage reference source 236 and the output of comparator 232 assumes a logic 0 potential. Supply voltage for the voltage reference source 236 is provided by battery 12 or generator 10 via line 248. As with voltage reference source 166, voltage reference source 236 may be an AD580 integrated circuit device manufactured by National Semiconductor Corporation.

The decel signal on line 224 indicates whether or not the vehicle engine deceleration is in excess of a reference amount. This signal may be attained by sensing the engine manifold vacuum or throttle position when the vehicle speed is in excess of a predetermined threshold. When engine deceleration in excess of a reference amount is indicated, the signal on line 224 assumes a logic 1 voltage potential. Otherwise, the signal on line 224 assumes a logic 0 voltage potential.

As set forth in the above-mentioned U.S. Pat. No. 4,310,793, the object of a charge float system is to raise the battery state of charge to a predetermined level each time the engine is started and to thereafter reduce the generator output voltage to a float value substantially corresponding to the nominal open circuit terminal voltage of the battery. When the generator output voltage used to charge the battery is determined as a function of the battery voltage and the battery temperature, the magnitude of the charging current may be used as an indication of the battery state of charge. Thus, in the circuit described herein, comparator 162 compares the battery charging current magnitude to a reference value corresponding to a charging current which is indicative of a sufficient battery state of charge. According to one aspect of this invention, it is recognized that a further condition precedent to suspending the charge mode of operation relates to the generator operation. Under conditions of low engine speed and hence low generator speed and high electrical loading, the generator output capacity may not be sufficient to maintain the required charging voltage. The resulting reduced generator output voltage could cause the charge current to fall below the reference value corresponding to the predetermined state of charge and thereby prematurely result in the suspending of the charge mode of operation and the engagement of the float mode of operation.

Accordingly, this invention includes a full field detecting circuit 230 for indicating if the generator field winding 16 is fully excited as would be the case under heavy electrical loading. The charge mode of operation is suspended only when the charging current falls below the reference value and the generator field winding is not fully excited. When the charge mode of operation is suspended and the float mode of operation is engaged, the generator output voltage is reduced substantially to the nominal open circuit terminal voltage of battery 12 to avoid the energy wastage associated with continued charging. Thereafter, during the float mode of operation, the generator output voltage—the float voltage—is adjusted up or down according to the net battery current so as to maintain the predetermined battery state of charge in effect at the establishment of the float mode of operation.

According to a further aspect of this invention, the generator output voltage is increased to a relatively high value if engine deceleration in excess of the reference amount is detected while the float mode of operation is engaged. This feature in cooperation with the float voltage adjustment results in an energy efficient mode of operation wherein a variable amount of energy is recovered from the moving mass of the vehicle and wherein the float voltage is accordingly adjusted to expend energy only in the amount required to maintain the battery state of charge in effect at the establishment of the float mode of operation. The logic circuit 220 monitors the engine deceleration signal on line 224, the full field signal on line 222 and the output of comparator 162 on line 226 and regulates the circuit operation to implement the above described control functions.

Referring now more particularly to the logic circuit 220, the output of comparator 162 on line 226 and the full field signal on line 222 are applied as inputs to NOR gate 250. As a result, the output of NOR gate 250 can assume a logic 1 voltage potential only if the charging current falls below the reference value on line 164 and the full field signal indicates that the generator field winding 16 is not fully excited. The output of NOR gate 250 is connected as an input to NOR gate 252 which in turn is connected through an RC timing network comprising resistor 254 and capacitor 256 and a diode 258 to line 54 which, as earlier described, controls the conduction of transistors 50 and 52. The other input to NOR gate 252 is obtained from a deceleration responsive circuit comprising D-type flip-flop 260 and AND gate 262. The deceleration signal on line 224 is applied as an input to AND gate 262 and also to the clock input (C) of flip-flop 260. The output or Q terminal of flip-flop 260 is applied as the other input to AND gate 262. The data or D terminal of flip-flop 260 is connected via line 264 to the output of NOR gate 250.

The operation of logic circuit 220 will now be described, it having already been established that the output of NOR gate 250 indicates whether the charge or float mode of operation is appropriate. If the deceleration signal on line 224 remains at a logic 0 voltage potential, NOR gate 252 operates to invert the output or NOR gate 250. Thus, when the charge mode of operation is indicated, the output of NOR gate 252 is at a logic 1 voltage potential and capacitor 256 is charged through resistor 254 to a logic 1 voltage potential. As a result, line 54 is held at a logic 1 voltage potential and transistor 52 is biased to a conductive state to establish the charge mode of operation. When the float mode of operation is desired, the output of NOR gate 252 falls to a logic 0 voltage potential and capacitor 256 is discharged through diode 258. As a result, the voltage potential on line 54 falls to a logic 0 voltage potential and transistor 50 is biased to a conductive state to engage the float mode of operation. Since line 54 is also connected to the preset input of up/down counters 176-180, the engagement of the float mode of operation also causes the output of counter circuit 172 on lines 104-110 to assume a predetermined value. Four-to-sixteen line decoder 100 and the resistors 66a-66n of circuit branch 46 are configured such that the predetermined preset output value of counter circuit 172 produces a generator output voltage substantially corresponding to the nominal open circuit terminal voltage of battery 12.

As described earlier, the clocking circuit 170 operates thereafter to raise or lower the count in counter circuit 172 according to the net battery current and to periodically strobe or enable four-to-sixteen line decoder 100 via line 16 to change the conduction state of transistor arrays 76 and 78 to reflect the current output value of counter circuit 172. During operation in the float mode, the output of NOR gate 250 and hence the data or D input to flip-flop 260 is at a logic 1 voltage potential. If the decel signal on line 224 is raised to a logic 1 voltage potential indicating engine deceleration in excess of a predetermined amount, the logic 1 at the data input of flip-flop 260 is clocked to the Q or output line of the flip-flop 260 and the output of AND gate 262 is raised to a logic 1 voltage potential. This accomplishes three things. Firstly, it assures that the output of NOR gate 252 and hence the voltage potential on line 54 is maintained at the logic 0 voltage potential regardless of the output level of NOR gate 250. Secondly, it raises the preset input of four to sixteen line decoder 100 to a logic 1 voltage potential via line 102 to cause transistor arrays 76 and 78 to assume a known or predetermined conduction state. Thirdly, it raises line 70 to a logic 1 voltage potential to bias transistor 68 to a nonconductive state so that the generator output voltage is raised to the relatively high level required to recoup kinetic energy associated with the moving mass of the vehicle during deceleration.

When the deceleration signal on line 224 falls to a logic 0 voltage potential indicating that the engine deceleration is no longer in excess of the reference amount, the output of AND gate 262 falls to a logic 0 voltage potential which releases four to sixteen line decoder 100 and biases transistor 68 to a conductive state to reestablish the float voltage. Although the output of NOR gate 250 may not be at a logic 0 voltage potential due to the heavy battery charging during deceleration, capacitor 256 and resistor 254 maintain line 54 at a logic 1 voltage potential for a time period sufficiently long to enable NOR gate 250 to change states. This time delay prevents a return to the charge mode of operation at the termination of a period of engine deceleration.

The operation of this invention will now be described in detail. When the vehicle electrical system is enabled and the vehicle engine is started, the battery 12 begins receiving charging current from generator 10 in an amount substantially in excess of the reference amount of 10 amperes. As a result, the output of comparator 162 assumes a logic 1 voltage potential and capacitor 256 is charged through NOR gate 252 and resistor 254. This action raises line 54 to a logic 1 voltage potential biasing transistor 50 to a nonconductive state and transistor 52 to a conductive state so that the generator output voltage is determined according to the battery voltage and temperature as sensed by circuit branch 48. In this way, the charge mode of operation is engaged when the vehicle engine is started. While the battery is being charged, comparator 162 compares the actual charging current as sensed by current shunt 26 to a reference charging current on line 164 to determine if the battery state of charge has risen to a sufficient level. In typical vehicle operation, only a few minutes of charging in the charge mode of operation is required to bring the battery state of charge to such predetermined level. If, during such operation, heavy electrical loading causes a reduction in the output voltage of the generator, the full field signal on line 222 holds the output of NOR gate 250 at a logic 0 voltage potential to prevent suspension of the charge mode of operation due to a reduced level of charging current. The charge mode of operation may only be suspended if the charge current falls below the reference value of 10 amperes and the generator field winding is less than fully excited.

During operation in the charge mode, the decel signal on line 224 is ineffective to alter the output voltage of generator 10 since the data input to flip-flop 260 is held at a logic 0 voltage potential thereby maintaining the output of AND gate 262 at a logic 0 voltage potential.

When the battery state of charge reaches a sufficient level, the charging current falls below the reference value of 10 amperes and the output of comparator 162 falls to a logic 0 voltage potential. If the generator field winding 16 is less than fully excited, the output of NOR gate 252 falls to a logic 0 voltage potential and capacitor 256 is discharged through diode 258. After a short delay, line 54 falls to a logic 0 voltage potential thereby presetting the output of counter device 172 to a predetermined level and biasing transistor 50 to its conductive state and transistor 52 to its nonconductive state. This operation serves to suspend or interrupt the charge mode of operation and to establish the float mode of operation. At such time, the generator output voltage is reduced to the nominal open circuit terminal voltage of battery 12 about 12.7 volts due to the presetting of counter circuit 172. As in other charge float systems, reducing the generator output voltage to a float voltage, increases the energy efficiency of the vehicle electrical system since continued charging of the battery is avoided and since the vehicle electrical loads are operated at a lower voltage. During the float mode of operation, the vehicle electrical loads are supplied primarily by generator 10, and the battery current is maintained very low. If the decel signal on line 224 rises to a logic 1 voltage potential indicating engine deceleration in excess of a reference amount while the float mode of operation is engaged, the output of AND gate 262 rises to a logic 1 voltage potential, thereby maintaining line 54 at a logic 0 voltage potential, biasing transistor 68 to its nonconductive state, and inhibiting four-to-sixteen line decoder 100 to force a predetermined output configuration. This operation serves to maintain transistor 50 in its conductive state regardless of the charging current magnitude and to force the total serial resistance between terminal 94 and terminal 40 of the voltage regulator 36 to a predetermined value which produces a relatively high generator output voltage for effecting relatively heavy charging of battery 12.

During such operation, the electrical loads 14 are also supplied with the higher generator output voltage. When the engine deceleration is no longer in excess of the reference amount, the voltage on line 224 and hence the output of AND gate 262 falls to a logic 0 voltage potential thereby removing the inhibit input of four-to-sixteen line decoder 100 and biasing transistor 68 to its conductive state. When the inhibit is removed from the four-to-sixteen line decoder, it returns to the output configuration in effect just prior to the engine deceleration. As a result, the output voltage of generator 10 is reduced back to the float voltage in effect prior to the period of engine deceleration.

During the time interval required to reduce the output voltage of generator 10, line 54 is maintained at a logic 1 voltage potential even though the output of NOR gate 252 is a logic 1 voltage potential due to the time constant of the RC network comprising resistor 254 and capacitor 256. According to the preferred embodiment of this invention, such time constant provides a delay of approximately 2 seconds. When the generator output voltage falls to the float level, and the charging current falls below the reference current of 10 amperes, the output of comparator 162 and hence NOR gate 252 falls to a logic 0 voltage potential maintaining line 54 at a logic 0 voltage potential and ending the period of relatively heavy charging during vehicle deceleration. As noted earlier, the delay afforded by resistor 254 and capacitor 256 prevents the charge mode of operation from being reengaged at the termination of a period of engine deceleration.

When the float mode of operation is initiated, the counter circuit 172 is reset by line 54. Thereafter, the current integrator comprising clocking circuit 170, comparator 156 and counter circuit 172 maintains a running indication of the net battery current. Periodically, divider 210 strobes four-to-sixteen line decoder 100 so that the conduction state of transistor arrays 76 and 78 may be updated to reflect the current counter output on lines 104-110. If the counter output indicates a net current into the battery—as for example, from charging during periods of engine deceleration—the conduction state of the array transistors is changed to decrease total serial resistance in circuit path 46 to thereby decrease the generator output voltage which establishes the float voltage. As such point, the battery 12 may begin to supply some current to the electrical loads 14. If the counter output on lines 104-110 indicates a net current out of the battery—as may be due to increased electrical loading—four-to-sixteen line decoder is effective when strobed to alter the conduction state of the array transistors to increase the total serial resistance in circuit branch 46 to thereby increase the generator output voltage for returning charging current to the battery 12. In the illustrated embodiment, transistor arrays 76 and 78 can be controlled to provide fourteen distinct levels of generator output voltage about the nominal open circuit terminal voltage of battery 12. As a result, the extremes of prolonged heavy charging on engine deceleration and prolonged heavy electrical loading may be accounted for by the battery current integrator and a suitable float voltage may be selected for maintaining the battery state of charge at the level in effect at the establishment of the float mode of operation.

While this invention has been described in reference to the illustrated embodiment, it will be understood that various system modifications may occur to those skilled in the art and that such systems may fall within the scope of this invention which is defined by the appended claims.

The embodiments of the invention in which an exclusive property or privilege is claimed are defined as follows:

1. In a vehicle electrical system including a battery adapted to supply power to vehicle electrical loads and to be charged by an engine-driven generator, a regulator mechanism for controlling the output voltage of said generator, control means connected to the regulator mechanism effective in a charge mode of operation to control the generator output voltage as a function of the battery voltage and temperature, and float means effective when the charging current supplied to the battery during the charge mode of operation of said control means falls to a predetermined value indicative of a satisfactory state of battery charge to interrupt the charge mode of operation and to initiate a float mode of operation wherein the generator output voltage is reduced to a float value substantially equal to the nominal open circuit terminal voltage of said battery to avoid the energy consumption associated with continued charging of the battery from the engine-driven generator after a satisfactory state of battery charge has been reached, the improvement comprising:

engine deceleration responsive means connected to the regulator mechanism and effective during engine deceleration in excess of a reference amount for increasing the generator output voltage to a fixed, relatively high value to produce relatively high battery charging current to thereby recoup kinetic energy from the vehicle during deceleration;

current integrating means for measuring and indicating the net current into and out of the battery; and generator control means effective at the initiation of said float mode of operation for resetting said current integrating means and thereafter for adjusting the generator output voltage in relation to said float value in accordance with the net current measurement of said current integrating means such that the voltage is increased above said float value if the current integrating means indicates a net current out of the battery and decreased below said float value if the current integrating means indicates a net current into the battery, to thereby maintain the satisfactory state of battery charge existing at the initiation of said float mode of operation despite variable electrical loading and variable battery charging occasioned by engine deceleration.

2. A vehicle electrical system according to claim 1, including:

means for disabling said engine deceleration responsive means prior to the initiation of said float mode of operation; and means connected to said float means and effective after the initiation of said float mode of operation to delay a return to the charge mode of operation for a timed period sufficient in duration to allow the relatively high battery charging current effected by the engine deceleration responsive means to fall to said predetermined value so that the relatively high battery charging current existing at the termination of a period of engine deceleration in excess of the reference amount is ineffective to reestablish the charge mode of operation.

3. In a vehicle electrical system according to claim 1 wherein the generator includes a field winding which is variably excited by the regulator mechanism to control the generator output voltage, and wherein the generator output capacity varies in direct relation to the level of field winding excitation, the improvement comprising:

means responsive to the operation of said regulator mechanism and effective when the generator field winding is substantially fully excited to override said float means and to maintain establishment of said charge mode of operation thereby to pevent the float means from initiating the float mode of operation when the generator is unable to supply a proper amount of charging current due to heavy electrical loading.

4. A vehicle electrical system according to claim 1, wherein:

the generator control means includes a serial resistor network connected to the regulator mechanism, switch means controllable to selectively shunt one or more of the network resistors for adjusting the generator output voltage, and means periodically enabled to control said switch means in accordance with the net current measurement of said integrating means.

* * * * *